(No Model.)
J. M. BASKET.
HAND SEED PLANTER.
No. 515,643. Patented Feb. 27, 1894.
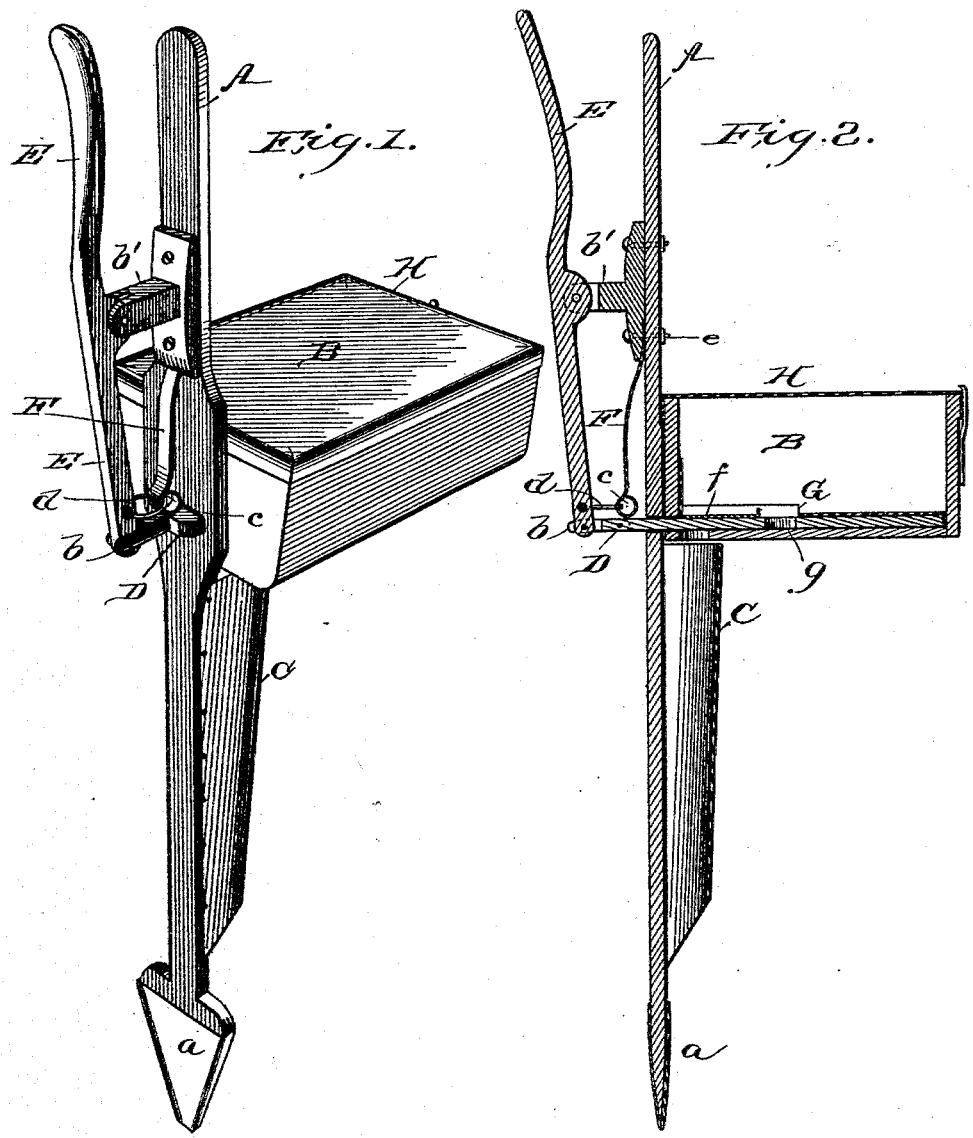
WITNESSES:
Fred G. Dieterich
Edw. W. Byrn.
INVENTOR
J. M. Basket.
BY Munn & Co
ATTORNEYS.

UNITED STATES PATENT OFFICE.

JAMES M. BASKET, OF LEOTA LANDING, MISSISSIPPI, ASSIGNOR OF ONE-HALF TO CHARLES T. WORTHINGTON, OF SAME PLACE.

HAND SEED-PLANTER.

SPECIFICATION forming part of Letters Patent No. 515,643, dated February 27, 1894.

Application filed September 1, 1893. Serial No. 484,543. (No model.)

*To all whom it may concern:*

Be it known that I, JAMES M. BASKET, of Leota Landing, in the county of Washington and State of Mississippi, have invented a new and useful Improvement in Hand Seed-Planters, of which the following is a specification.

The object of my invention is to provide a simple and efficient hand-planter for planting corn, peas, beans, and other seeds, and it consists in the peculiar construction and arrangement of the parts which will now be described with reference to the drawings in which—

Figure 1 is a perspective view; Fig. 2 a vertical longitudinal section, and Fig. 3 an inside view of the seed box.

In the drawings A represents the main stem or handle bar of the planter. This at its lower end is widened out to form a penetrating head or trowel $a$ for forming a cavity in the earth into which the seed are to be deposited. To resist wear this trowel end is covered with an armor of metal. The main stem is made of a convenient length to be operated from its upper end without stooping, its upper end being formed into a handle. About three feet from the lower end the main stem is made wider, and to it is firmly attached a seed box B adapted to hold such amount of seed as may be conveniently carried. To the side of the main stem below the seed box, and extending from the seed box to a point near the trowel-shaped end there is attached a spout or conveyer C for carrying the seed from the box to the ground without risk of being scattered by the wind. This spout is formed by simply bending a piece of sheet metal, or other flexible material, around and tacking its edges to the edges of the main stem. In the broad part of the stem, and just above the level of the bottom of the box, there is a transverse slot through which plays a feed slide D with an opening through it near the middle. This slide is pivotally connected by links $b$ to the lower end of an operating lever E arranged substantially parallel to the main stem and whose upper end is formed into a handle that extends to and terminates near the top of the handle of the main stem. This lever is fulcrumed near the middle upon a detachable bracket $b'$ whose base is screwed or bolted to the main stem. The lower end of this lever and the attached feed slide are forced inwardly by a flat spring F, one end of which is formed into an eye $c$ which is connected to the lever by a link $d$. The other end of this spring is perforated to receive the screw or bolt $e$ that secures the fulcrum bracket, said spring being clamped and securely held by such screw or bolt between the bracket and the main stem. In the bottom of the seed box is arranged longitudinally a feed slide guide and housing G made of sheet metal, one portion of which is completely covered, and the other portion of which is open on top and partly covered by a rectangular gage strip $f$ whose outer end is turned up. In the feed slide is formed the hole $g$ that is in open communication with the seed box, when the slide is forced in, and forms a receptacle to receive a charge of seed. When the slide is pulled out by the action of the lever this receptacle passes under the turned up edge of the gage strip $f$, and transfers its charge of seed to a position directly over a hole leading to the spout below through which they fall. To prevent spilling seed the seed box is provided with a suitable detachable cover H.

In operating this hand planter, it is grasped in the hand at the top, the hand inclosing both the handle at the top of the main stem and the seed box next to the operator. The lower end or trowel is then swung forward to an angle of about forty-five degrees and is forcibly driven into the ground; then as the workman moves forward it is tilted forward at its upper end until it reaches an upright or perpendicular position which loosens the trowel and at the same time opens the hole beside the same for the seed. At the moment the perpendicular position is attained, the hand is squeezed upon this operating lever, and a charge of seed is dropped from the seed box down the spout into the opening in the earth beside the trowel made by its lateral motion. The whole device is then lifted, and the earth, falling into the hole as the trowel is withdrawn, covers the seed and completes the planting.

I am aware that hand seed planters have been heretofore constructed as shown in Patents Nos. 91,325 and 152,471, in which a handle with a seed box, spout, and opener are employed, and I therefore make no broad claim to this general combination of elements. My invention is distinctive in the fact that both the main stem A and lever E are to be grasped by and operated with one hand while walking briskly along, the seed slide plays at right angles through an enlarged portion of the main stem into the seed box in a novel way, and the special arrangement of the retracting spring for the seed slide is also a desirable and novel construction.

Having thus described my invention, what I claim as new, and desire to secure by Letters Patent, is—

1. A hand seed planter consisting of a main stem with a trowel or opener at its lower end and a feed slide opening in its middle, a seed box attached to the side thereof opposite the feed slide opening, a spout secured to the stem between the seed box and trowel end, a feed slide playing at right angles to the main stem through the hole in the same and in the bottom of the seed box, an operating lever having its lower end connected to the feed slide, and its upper end extended up to the handle of the main stem so that both may be grasped by the same hand and a spring for forcing the feed slide into the seed box all combined substantially as shown and described.

2. The combination in a hand planter, of the main stem with seed box fixed to its side and feed slide playing through the stem into the box, a fulcrum bracket bolted or screwed to the main stem and carrying a fulcrumed operating lever connected to the feed slide, and a retracting spring for the feed slide secured between the fulcrum bracket and main stem by one of its fastening bolts or screws substantially as shown and described.

3. A hand seed planter consisting of the combination of the main stem A with trowel and widened and slotted middle portion, the seed box B fixed to the side thereof and provided with feed slide housing and guide G and cage strip H, the perforated feed slide D, the fulcrum bracket C carrying operating lever E, the retracting spring F, and the spout, substantially as shown and described.

LEE H. BASKET.

Witnesses:
L. WEITZUFELD.